Oct. 10, 1972  T. L. CHAMBERLAIN ET AL  3,697,360
METHOD FOR MAKING SANDWICH LAMINATIONS IN ONE PASS
Filed Dec. 4, 1969  2 Sheets-Sheet 1
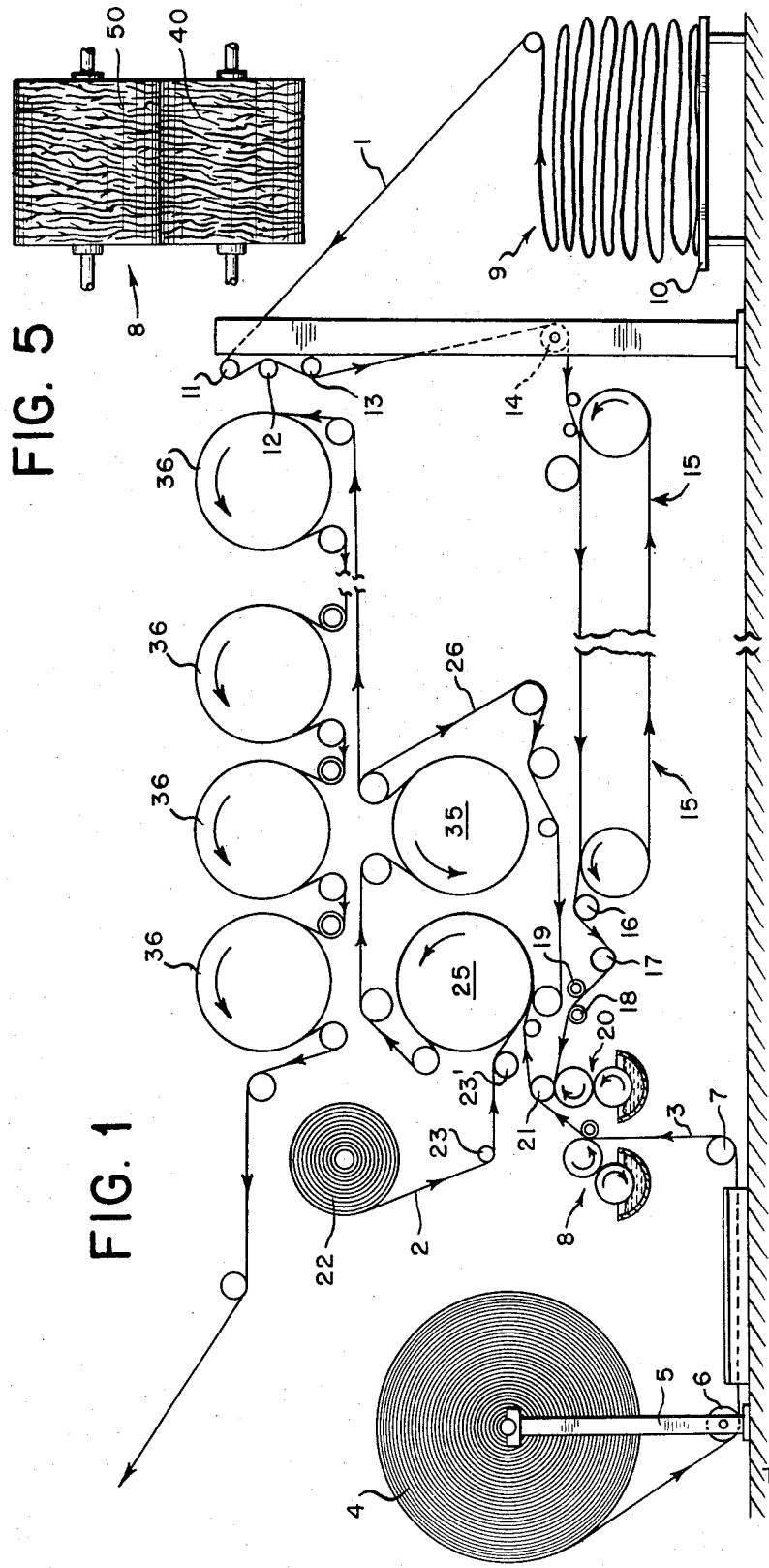
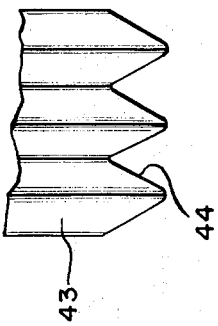
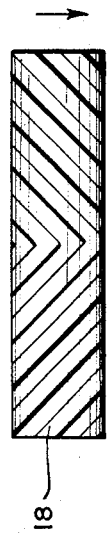
INVENTORS
TERRANCE L. CHAMBERLAIN
RICHARD P. SEARS
IVAN H. FLETCHER, JR.
BY *Bennie, Edmonds*
*Morton, Taylor & Adams*
ATTORNEYS

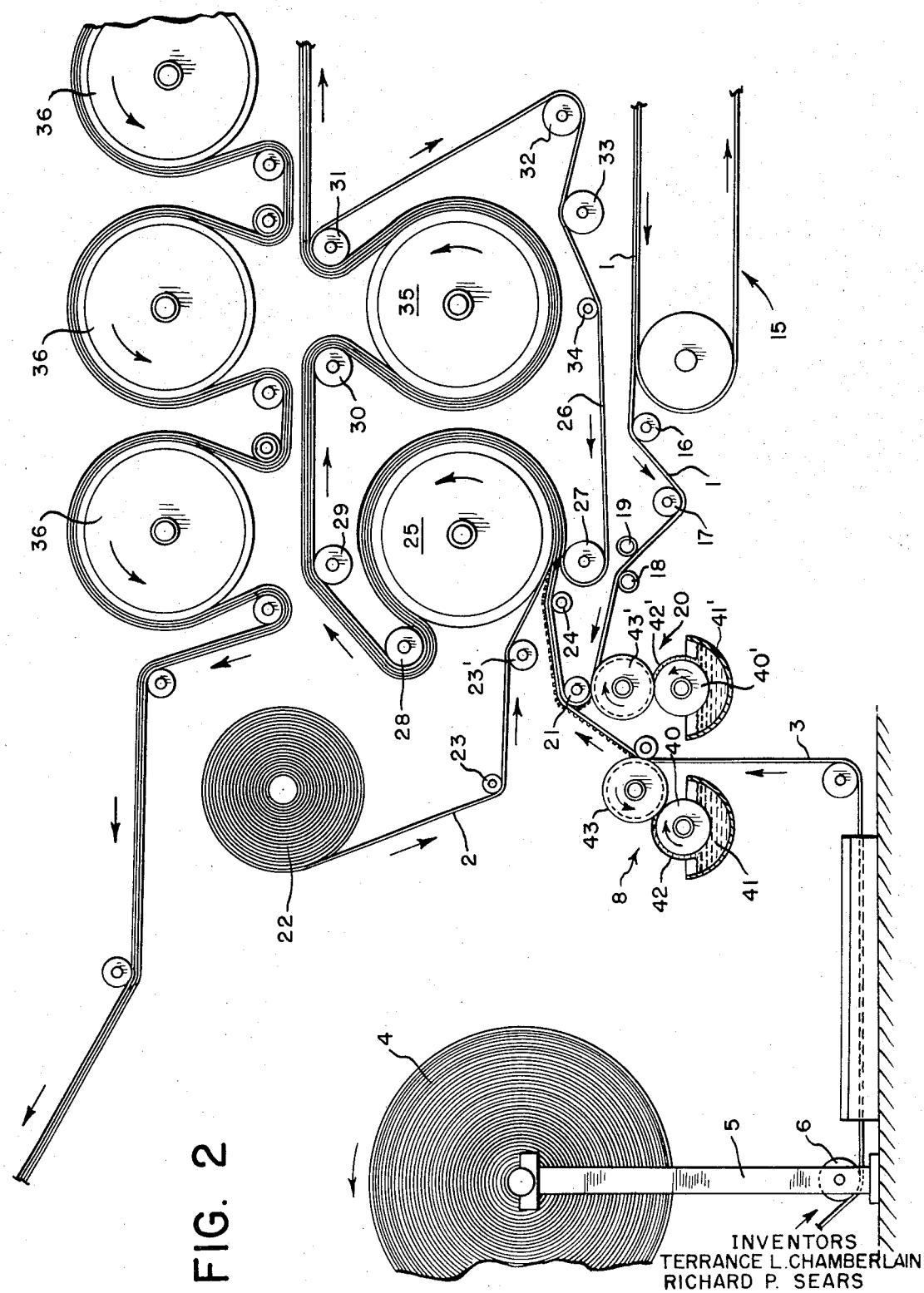

3,697,360
METHOD FOR MAKING SANDWICH LAMINATIONS IN ONE PASS

Terrance L. Chamberlain, Corinna, Richard P. Sears, Abbot Village, and Ivan H. Fletcher, Jr., Newport, Maine, assignors to Coin Sales Corporation
Filed Dec. 4, 1969, Ser. No. 882,147
Int. Cl. B32b 31/08, 31/20
U.S. Cl. 156—551                           1 Claim

ABSTRACT OF THE DISCLOSURE

Method for bonding two moving webs of a cover material to opposite sides of a moving web of a core material including means for applying discrete portions of adhesive to the surface of one of the webs of cover material and to one of the surfaces of the core material, means for bringing the two moving webs of cover material into contact with the moving web of core material and means for holding all the webs together while subjecting the adhesive to heat in order to cure the adhesive in one pass through the apparatus.

The method of bonding two webs of a cover material to opposite sides of a moving web of core material comprising the steps of applying discrete portions of adhesive to one surface of the web of core material and discrete portions of adhesive to one side of one web of cover material, bringing a web of cover material into contact with each side of the web of core material and compressing the resultant laminate of webs together while subjecting the laminate to heat in order to cure the adhesive.

BACKGROUND OF THE INVENTION

Conventional laminated fabric which comprises a core material covered on both its sides by a cover material may be made in a number of ways. Where the core material comprises a foam such as polyurethane foam, the foam material is often bonded to the cover material by using a flame to burn off and melt part of the foam material whereby the melted foam becomes the adhesive to bond the remainder of the foam material to the cover material. The disadvantage of this method of making the laminate is that much of the foam material is destroyed by the flame in order to provide the adhesive. This increases the expense of the laminate since more of the foam material has to be utilized in the production of the laminate than is actually included in the resultant laminate. This loss of foam material becomes even more acute where a cover material is to be applied to both sides of a foam material as is the case where the resultant laminate is an insulated fabric comprising an outer face fabric, a foam material serving as an insulation and a lining material.

Another method of producing a laminated fabric is to bond the cover materials to opposite sides of a core material by means of an adhesive. This method, when used in a continuous bonding operation as contrasted with a batch operation, has required the application of adhesive to either side of a web of core material or to one side of one of the webs of cover material, bringing the web of core material and the web of cover material together and then running the resultant laminate of two webs over a series of heating drums in order to cure and set the adhesive. The resultant laminate of the web of core material and one of the cover materials would then have to be rerun through the machine in order that adhesive could be aapplied to either the web of core material or to the remaining web of cover material and to cure the adhesive between the second cover material and the core material. This rerunning of the laminate through the machine a second time results in low production capacity of the machine thus increasing the expense of the fabrication.

In some insulated fabrics utilizing a face fabric and a lining fabric as the cover material, the face fabric may be sensitive to high temperatures such that it is often desirable to subject this fabric to lower temperature during curing than the lining fabric thus requiring different temperature settings for the apparatus between successive runs through of the laminate.

A difficulty that exists in some bonding apparatus, and particularly apparatus requiring a second run through as discussed above, is that the application of the face fabric onto the core material cannot be observed. This can be troublesome where it is necessary for the face fabric to be positioned exactly on the core material as is the case when the face fabric comprises a plaid material. If the face fabric is observable, then steps can be taken while the machine is running to assure correct bonding.

It is therefore an object of our invention to provide an apparatus and method of making laminated fabrics comprising a core material covered on each side by a cover material by which the fabric will only have to pass through the bonding apparatus once and to further provide adhesive applicator means and guide means such that the cover material comprising a face fabric will not be subjected to excessive heat and such that this face fabric is visible substantially throughout its passage through the bonding apparatus.

SUMMARY OF THE INVENTION

Broadly, the bonding apparatus of our invention comprises a means for feeding a web of core material past a first adhesive applicator by which discrete portions of adhesive are applied to one side of the web of core material. A feeding means is included for feeding a web of a face fabric towards the moving web of core material and a second adhesive applicator means is provided for applying discrete portions of adhesive to one side of the web of face fabric. A means is included for bringing the face fabric and the discrete portions of adhesive thereon into contact with the web of core material. In addition, a feeding means is provided for feeding a web of lining material towards the web of core material and to the side of the core material to which the discrete portions of adhesive material applied by the first applicator means are carried. The apparatus also includes heating means in the form of heating drums adapted to contact the lining material after it has been joined to the core material in order to subject the discrete portions of adhesive between the lining material and the core material and between the face material and the core material to a curing action.

The method of the invention broadly consists of the steps of applying discrete portions of adhesive to one side of cover or face material, applying discrete portions of adhesive to one side of a web of core material, bringing the side of the face material having adhesive thereon into contact with the web of core material, bringing a web of a cover of lining material into contact with the discrete portions of adhesive on the core material, and subjecting the webs to a compressive force while at the same time applying heat to the lining material in order to cure the adhesive between the lining material and core material and between the core material and face material.

As used in the specification, discrete portions of adhesive contemplates spaced areas of adhesive, such as droplets or solid lines, spaced apart by open areas free of adhesive as contrasted with a solid impermeable film of adhesive.

DESCRIPTION OF THE DRAWINGS

FIG. 1 is a schematic side view of a laminating apparatus constructed according to our invention. FIG. 2 is an enlarged view of a portion of FIG. 1. FIG. 3 is an enlarged plane view of a scroll roller as used in the apparatus of FIG. 1; FIG. 4 is a partial enlarged view of an adhesive applicator roll as used in the apparatus of FIG. 1; and FIG. 5 is a front view of a different form of applicator roll than that shown in FIG. 4.

DESCRIPTION OF THE INVENTION

Referring to FIG. 1, there is illustrated schematically a bonding apparatus by which a web of cover or face material 1, usually a textile fabric, and a web of a second cover material 2, usually a lining material, may be bonded to opposite sides of a web of core material 3, usually an insulating foam type material. As shown, a web core supply means is provided comprising in part a roll 4 of the core material supported by a roll stand 5. The web 3 is withdrawn from the roll 4 and passes around guide rollers 6 and 7 and moves upward towards a first adhesive applicator station 8.

The web of cover material or face fabric 1 is fed from a web cover supply means 9, which as shown in the drawings, comprises a stand 10 supporting a supply of folded fabric. It is apparent that the fabric could be in a roll form such as is the supply of core material. The web 1 is passed over a plurality of guide and feed rolls 11, 12, 13 and 14 into a tenter frame 15 where the web of fabric is tensioned and stretched in order that it will be properly aligned when bonded to the core material. The tenter frame is conventional and thus its details need not be described in great detail. The web of fabric upon leaving the tenter frame 15 passes over guide rolls 16 and 17 and between adjustable scroll rollers 18 and 19 which serve to maintain proper tension of the fabric in the width-wise direction of the web. From scroll rollers 18 and 19, the fabric passes to a second adhesive applicator station 20 by which adhesive is applied to one side of the web of face fabric as hereafter explained in greater detail.

The face fabric is then guided around a guide roll 21 where it is brought into contact with the web 3 of the core material.

The web of lining material 2 is fed from a web cover supply means comprising a roll 22 wherein the material is an acetate tricot or other light material. The web 2 passes over guide rollers 23 and 23' onto the surface of a heating drum 25 where it is brought into contact with the side of the web of core material to which discrete portions of adhesive have been deposited by the first applicator station 8.

Referring to FIG. 2 which illustrates a portion of the machine in greater detail, the laminate made up of the cover web 1 and core web 3 is passed over a guide roll 24 such that the side of the web of core material is brought into contact with the side of the web of lining material and such that the lining side of the laminate of the three webs is brought into initial contact with a heating drum 25. An endless blanket 26 passes around a guide roll 27 and contacts the outer face of the web of face material 1. Rollers 27 as well as rollers 28, 29, 30, 31, 32, 33 and 34 guide the endless blanket around a major portion of the periphery of the heating drum 25 as well as heating drum 35 and are adjustable in order to control tension in the endless blanket. By varying tension in the endless blanket, compressive or squeeze force between the webs 1, 2 and 3 may be regulated as the webs pass over the heating drums 25 and 35 to insure sufficient pressure between the adjacent webs while the adhesive between the webs is subjected to curing action from the heating drums. After passing from the guide roll 31, the resultant laminate of the webs 1, 2 and 3 is passed over a plurality of heating drums 36 to further subject the adhesive between adjacent webs to a curing action.

It is seen from reference to FIG. 2 that the first adhesive applicator station 8 comprises an adhesive pickup roll 40 which rotates within a bowl 41 containing a supply of adhesive such that the roll picks up a layer 42 of adhesive on its outer periphery. Roll 41 is positioned closely adjacent an applicator roll 43 such that the film 42 on the roll 41 is transferred to roll 43. The roll 43 is, as shown in FIG. 4, circumferentially grooved.

The core material 3 is usually a foam material of fragile construction so that in order to insure that the material is subjected to a minimum of shear action which might tear the material, it is necessary that the roll 43 rotate in the same peripheral direction as the movement of the web of material. By utilizing a grooved applicator roll, usually on the order of 20–28 grooves to the inch, the adhesive within the grooves of the roll will, because of surface tension of the adhesive, draw up into individual droplets to form discrete portions of adhesive with spaces therebetween in the manner as taught in U.S. Pat. No. 3,330,717. Since the core material will be in the middle of the finished laminate fabric and thus will not be visible, it makes no difference whether the adhesive is forced into the body of the core material by the backup roll 21' such an amount as to cause strike-through of adhesive to the opposite side of the core material from that which it was applied.

The adhesive station 20 comprises a pickup roll 40' rotatable within the bowl 41' containing a supply of adhesive such that a layer 42' of adhesive is picked up from the roll and transferred to a grooved applicator roll 43' in the same manner as with the station 8. The important difference between stations 8 and 20 is that in station 20 the direction of rotation of the applicator roll 43' is such that its peripheral direction is opposite and parallel to the movement of the web 1 at the point of contact of the web with the roll. The portions of adhesive in the grooves of the roll 43' draw up into individual droplets as does the adhesive on the roll 43, however, because the roll 43 is rotating in the opposite direction to the movement of the web of face fabric, the individual droplets are never drawn into the nip formed between the applicator roll 43 and the backup or guide roll 21. Thus, as the web 1 passes between the nip formed between rolls 43' and 20, it will contact the raised droplets of adhesive as they approach the nip area and the droplets will be transferred to the fabric which is moving away from the nip area before being brought into contact with the nip area. This prevents the individual droplets of adhesive from being forced into the body of the web of face material to assure that there is no strike-through of adhesive to the opposite side of the web of face material which could result in an unsightly appearance of the finished product. The rheology of the adhesive used is such that by the time the laminate of webs 1, 2 and 3 are subjected to the squeeze force of the blanket 26, the adhesive will be stiff enough to prevent further penetration into the web 1 of face fabric thus eliminating any strike-through.

Scroll rollers are provided throughout the bonding machine, for example rollers 18 and 19 and rollers 50 associated with each heating drum 36, to insure that width-wise tension is maintained in the various webs during joinder of the webs and during curing of the adhesive. The scroll rollers are helically grooved with the grooves extending outwardly from the center of each roller as illustrated in FIG. 3 which is a plan view of roller 18 wherein the arrow indicates the direction of rotation of the roller and movement of the web over the roller.

As seen by reference to the drawing, the method of bonding the web of face material 1 and web of lining material 2 to the web of core material 3 comprises a number of steps. The web 3 is moved along a path which, as shown in the drawings, is substantially vertical to engage the droplets of adhesive on the applicator roll 43 which is rotating in a direction such that its peripheral movement at the point of adhesive engagement with the web 3 is parallel to and in the same direction as that of the web. The web of face material 1 is moved along a path, which as shown in the drawing is substantially horizontal, to engage the droplets of adhesive on the applicator roll 43' which is rotating in a direction such that its peripheral movement is parallel and opposite that of the web 1 at the point of engagement of the web with the adhesive droplets.

The side of the web 1 on which the adhesive droplets have been transferred by the applicator roll 43' is then brought into contact with the side of the web of core material 3 which is free of adhesive. The web of lining material 2 is then brought into engagement with the adhesive droplets on the web of core material 3 such that the three webs overlie one another to form a laminate. This laminate is then passed over the heating drums in order to cure the adhesive with the web of lining material engaging the surface of the drums.

While the paths of movement of the webs 1 and 3 at the point of adhesive transfer from the applicator rolls are shown as being respectively substantially horizontal and vertical, the paths could be varied by varying the position, but not rotation, of the applicator rolls.

Referring to FIG. 5, there is illustrated a different embodiment of applicator roll 50 which has a smooth surface rather than a grooved surface as with rolls 43 and 43'. In this form of the invention, the rheology characteristics of the adhesive are such that the adhesive will form wrinkled or crow feet patterns on the applicator roll after being applied thereto by the pickup roll which pattern is subsequently transferred to the web of core material 3 or of lining material 1. The wrinkles in themselves form discrete portions of adhesive so as to provide the same bonding characteristics between the core material or cover or lining material as when a grooved roll is used. The view in FIG. 5 is a front view of the rolls with the rolls rotating in a direction out of the plane of the drawing at the nip area between the rolls.

The apparatus and method as described provides for economical production of a three-ply adhesive bonded laminate in that the webs forming the plys of the laminate can be bonded together in one pass through the apparatus. Further, the machine and method assure that a web of the laminate that may be sensitive to high temperatures during curing of the adhesive will not be brought into direct contact with any heating surface. In addition, the method and apparatus allow continued visual inspection throughout the bonding procedure of one web of the laminate which, when the web is a face fabric, is an important consideration to assure proper alignment of the face fabric in the resultant laminate.

We claim:
1. A method of bonding a web of lining material and a web of face material to opposite sides of a web of foam core material comprising the steps of:
(a) moving said bed of core material in a first predetermined path,
(b) moving first discrete portions of adhesive substantially parallel to a portion of said first path and in the same direction of movement as said web of core material,
(c) bring the first discrete portions of adhesive and said web of core material into contact with each other and transferring the first discrete portions to the web of core material,
(d) moving said web of face material in a second predetermined path,
(e) moving second discrete portions of adhesive substantially parallel to a portion of said second path and in the opposite direction of movement of said web of face material,
(f) bringing the second discrete portions of adhesive and said web of face material into contact with each other to transfer the second discrete portions to the web of face material,
(g) bringing the web of face material and second discrete portions of adhesive supported thereon into contact with said web of core material such that they overlie one another,
(h) bringing the web of lining material into contact with the web of core material and the first discrete portions of adhesive supported thereon after the second discrete portions of adhesive have been brought into contact with said web of core material such that the web of lining material overlies the web of core material, and
(i) bringing the web of lining material into contact with a heated surface to set and cure the first and second discrete portions of adhesive.

References Cited
UNITED STATES PATENTS

| | | | |
|---|---|---|---|
| 2,800,946 | 7/1957 | Steffen | 156—551 X |
| 3,330,717 | 7/1967 | Roullard | 156—548 |
| 2,330,530 | 9/1943 | Tuttle | 156—551 X |
| 3,039,907 | 6/1962 | Scholl | 156—549 X |

BENJAMIN A. BORCHELT, Primary Examiner

J. M. HANLEY, Assistant Examiner

U.S. Cl. X.R.

156—374